United States Patent [19]

Ida et al.

[11] Patent Number: 5,004,980
[45] Date of Patent: Apr. 2, 1991

[54] WHEEL BEARING APPARATUS PROVIDED WITH COMPACT WHEEL ROTATION SPEED DETECTOR LYING WITHIN THE OUTSIDE PERIPHERY OF THE BEARING APPARATUS

[75] Inventors: Tomoyasu Ida; Makoto Nohara; Nobuyuki Seo, all of Osaka, Japan

[73] Assignee: Koyo Seiko Co., Ltd., Osaka, Japan

[21] Appl. No.: 413,387

[22] Filed: Sep. 27, 1989

[30] Foreign Application Priority Data

Jun. 2, 1989 [JP] Japan .................. 1-141778

[51] Int. Cl.$^5$ .............................................. G01P 3/48
[52] U.S. Cl. .................. 324/166; 324/207.21; 324/207.25
[58] Field of Search ............... 324/160, 166, 173, 174, 324/207.11, 207.14, 207.21, 207.25, 229–231, 235, 237; 338/32 R

[56] References Cited

U.S. PATENT DOCUMENTS

| | | | |
|---|---|---|---|
| 3,651,901 | 3/1972 | Burckhardt et al. | 324/174 X |
| 3,846,697 | 11/1974 | Cila et al. | 324/174 X |
| 4,364,011 | 12/1982 | Bloomfield et al. | 324/165 X |
| 4,595,897 | 6/1986 | Amano et al. | 324/174 X |
| 4,629,982 | 12/1986 | Kieslich | 324/207.23 |
| 4,652,818 | 3/1987 | Buchschmid et al. | 324/174 |
| 4,680,543 | 7/1987 | Kohen | 324/207.15 |
| 4,732,494 | 3/1988 | Guers et al. | 324/207.22 X |
| 4,778,286 | 10/1988 | Kadokawa | 384/446 |
| 4,829,245 | 5/1989 | Echasseriau et al. | 324/207.15 X |

*Primary Examiner*—Reinhard J. Eisenzopf
*Assistant Examiner*—Warren S. Edmonds
*Attorney, Agent, or Firm*—Wenderoth, Lind & Ponack

[57] ABSTRACT

A wheel bearing apparatus provided with a wheel rotational speed detector which has a simplified L-shape and is constituted by a detector end portion and a circuit housing perpendicular to the detector end portion. The detector end portion contains a sensor in opposition to a detected member fixed to a rotating inside member of the wheel bearing and is embedded in an outside member of the wheel bearing, while the circuit housing contains a circuit for processing a signal input from the sensor and is mounted on an outside surface of the outside member in parallel with the axial direction of the outside member so that the circuit housing is inside in the radial direction of the outside surface of a flange provided for the inside member.

9 Claims, 12 Drawing Sheets

WHEEL BEARING APPARATUS PROVIDED WITH COMPACT WHEEL ROTATION SPEED DETECTOR LYING WITHIN THE OUTSIDE PERIPHERY OF THE BEARING APPARATUS

BACKGROUND OF THE INVENTION

The present invention relates to a wheel bearing apparatus which is comprised of a rotating inside member provided with a detected member, an outside member, and a wheel rotation speed detector having a detection end portion which includes a sensor in opposition to the detected member, and a circuit housing which is connected to the detection end portion and which includes a circuit to process the detection signal received from the sensor, being able to be used, for example, on an automotive drive wheel of the type provided with an antilock brake system which detects the wheel velocity by means of a rotation speed detector and controls the wheels based on this detected speed so that they do not lock when the brakes are suddenly applied.

A wheel rotational speed detector mounted on a wheel bearing of type which constitutes an essential component in an antilock brake system as described above requires high detection precision and extremely high vibration resistance and sealing performance in order to maintain high detection precision. If these requirements are not provided, the detector may be damaged by vibrations and penetrated by water or other foreign matter, thus causing the rotational speed detector to break down or malfunction, or to lead even to a major accident.

At the same time, small, compact rotational speed detectors installed on wheel bearing apparatuses are desirable in order to minimize the restrictions of the installation space and to make the wheel bearing apparatus itself more compact. However, at the current level of technology, the rotational speed detector is unavoidably large because of the need for high vibration resistance and sealing performance as described above, and it is not possible to completely embed the rotational speed detector in the outside member.

Conventionally, an axle bearing apparatus provided with a rotational speed detector as thus described comprises, as shown in FIG. 18, an inside member 104 having a basically cylindrically shaped main member 101 and a flange 102 at the end portion 101a of main member 101, the flange 102 projecting to the outside and being used for mounting to a wheel. A wheel axle (not shown in the figure) passes through through-hole 104a at the center of main member 101. The inside member 104 is provided with a detected member 103 which is comprised of multiple projections 103a at regular intervals around the circumference of main member 101 and projecting to the outside in the radial direction. This wheel bearing apparatus is also provided with an outside member 106 on the same axis as the inside member 104 and fixed to a chassis (not shown in the figure) at mounting portion 105, multiple rolling elements 107 provided between raceway surfaces 104a, 104b of inside member 104 and raceway surfaces 106a, 106b of outside member 106 so as to roll in the circumferential direction on the raceways, and a cylindrically shaped rotational speed detector 112 mounted in outside member 106 and comprised of a detector end portion 110 and a circuit housing 111. Said detector member 110 is mounted in opposition to detected member 103 of inside member 104 and includes a sensor which is not shown in the figure, and circuit housing 111 houses a circuit, not shown in the figure, which processes the detection signal received from the sensor. The rotational speed of the inside member 104 is detected by the rotational speed detector 112. (See U.S. Pat. No. 4,778,286.)

However, in a conventional wheel bearing apparatus provided with a wheel rotational speed detector as described above, said rotational speed detector 112 has a simple cylindrical shape extending in the axial direction and cannot be made to be a sufficiently compact device with the current state of technology, the problem is that when the rotational speed detector 112 is mounted on outside member 106 so that the detector end portion 110 is in opposition to the detected member 103 of the inside member 104, circuit housing 111 projects significantly to the outside in the radial direction from the outside surface of the outside member of the main body. While the rotational speed detector 112 shown in FIG. 18 is small, the detector is actually quite large when the signal processing circuit is housed inside and the rotational speed detector 112 actually extends beyond the outside edge of mounting member 105 in common applications. Thus, because the rotational speed detector 112 projects significantly, the wheel bearing apparatus cannot be handled easily during transportation or installation of the wheel bearing apparatus because the protruding rotational speed detector 112 can easily strike other parts and be subjected to unanticipated external forces which could result in damage to the rotational speed detector.

SUMMARY OF THE INVENTION

Therefore, the object of the present invention is to provide a wheel bearing apparatus comprised of a rotational speed detector which is easy to handle because the rotational speed detector does not project greatly from the outside surface of the outside member when the wheel bearing apparatus is installed a the outside member so that the detection end portion is in opposition to the detected member of the inside member.

In order to achieve the object, a wheel bearing apparatus according to the present invention is characterized by comprising an inside member having a main body, a flange projecting to the outside on one end of said main body for mounting the wheel bearing apparatus to a wheel, and a detected member which has multiple projections placed at a regular intervals around the circumference of the main body; an outside member which is placed on the same axis as the inside member and fixed to a chassis; multiple rolling elements which are placed between raceway surfaces of the inside member and raceway surfaces of the outside member; and a wheel rotational speed detector which is mounted on the outside member and which includes a detector end portion having a sensor in opposition to the detected member of the inside member, and a circuit housing which is connected to the detector end portion and contains a circuit for processing a signal input from the sensor, so that the rotation of the inside member is detected by the wheel rotational speed detector, wherein the wheel rotational speed detector has a simplified L-shape, and the detector end portion is embedded in the outside member and extends basically in the radial direction of the outside member so as to be in opposition to the detected member, and the circuit housing is provided on the outside surface of the outside member in parallel with the axial direction of the outside member so that said circuit housing is inside, in the radial direction, of the outside surface of the flange.

When the detector end portion is embedded in the outside member so as to be in opposition to the detected member, the circuit housing is mounted on the outside surface of the outside member to extend in the axial direction. Thus, the circuit housing does not extend greatly in the radical and outside direction as does the circuit housing of a conventional rotational speed detector in which the circuit housing extends in a single axial direction from a detector end. The dimension of the projection from outside member of circuit housing is only that of the circuit housing in the direction perpendicular to the axial direction of the outside member. The circuit housing is positioned inside, in the radial direction, from the outside circumference surface of the flange of inside member for fitting a wheel.

The sensor contained in the detector end portion detects the passage in the circumferential direction of the multiple projections of the detected member and transmits signals corresponding to the passage of multiple projections to the circuit in the circuit housing. The circuit processes the signals received from the sensor in a predetermined way and outputs signals representing the rotational speed of the inside member.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENT

Figure 1:
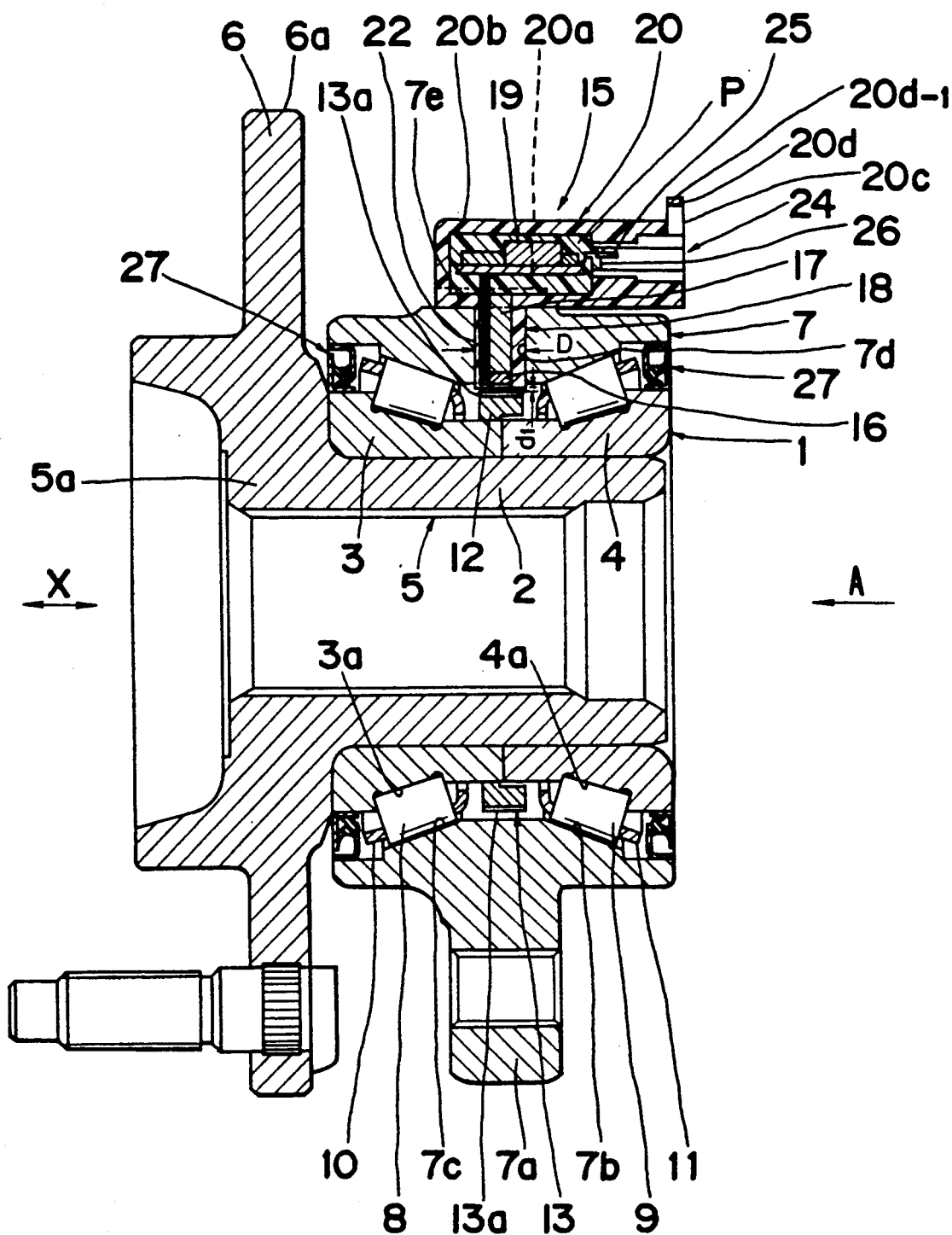
FIG. 1 is a cross section in the axial direction of a first embodiment of a wheel bearing apparatus provided with a wheel rotational speed detector according to the present invention and taken on section line 1—1 of FIG. 2.

FIG. 1 shows an axial cross section of a first embodiment of a wheel bearing apparatus provided with a wheel rotational speed detector. Reference number 1 designates the inside member, which is comprised of a simple cylindrically-shaped main body 5 and wheel mounting flange 6; said main body 5 is comprised of a cylindrical portion 2 and annular raceway members 3, 4 which are fit on cylindrical portion 2, and said flange 6 is provided on one end 5a of main body 5 and projecting to the outside in the radial direction. Reference number 7 designates a simple cylindrically-shaped outside member provided on the same axis as inside member 1 and having multiple flanges 7a (see FIG. 2) projecting to the outside in the radial direction. Reference numbers 8 and 9 designate rolling elements provided between raceway surfaces 3a, 4a and raceway surfaces 7b, 7c so as to roll in the circumferential direction on the raceways; raceway surfaces 3a, 4a are provided at the outside circumference of raceway members 3, 4 of inside member 1, and raceway surfaces 7b, 7c are provided at the inside circumference of outside member 7. Reference numbers 10, 11 designate retainers which are placed between raceway members 3, 4 and the outside member, and which hold the dual series of rolling elements 8, 9 each at a regular interval around the respective circumferences. The inside member 1 is supported by said dual series of rolling elements 8, 9 so as to rotate in the circumferential direction on the raceways inside outside member 7.

An annular member 12 is fixed to raceway member 3 of inside member 1 at an intermediate position between the dual series of rolling elements 8, 9 in the axial direction. At the outside circumference of this annular member 12 is formed a detected member 13, which is comprised of multiple projections 13a projecting in the radial direction at a regular intervals around the circumference.

To the flange 6 of inside member 1 is mounted a wheel, which is not shown in the figure. This inside member 1 has a hollow center through which passes an axle, not shown in the figure, which is driven to power the drive wheels, but this axle may also be used for non-driven (follower) wheels. In this latter case, it is not necessary for the axle to pass all the way through inside member 1, and the inside member 1 need not, therefore, be open on both ends. The outside member 7, however, is fixed to a suspension member provided on the chassis of the vehicle, neither of which are shown in the figure.

Figure 2:
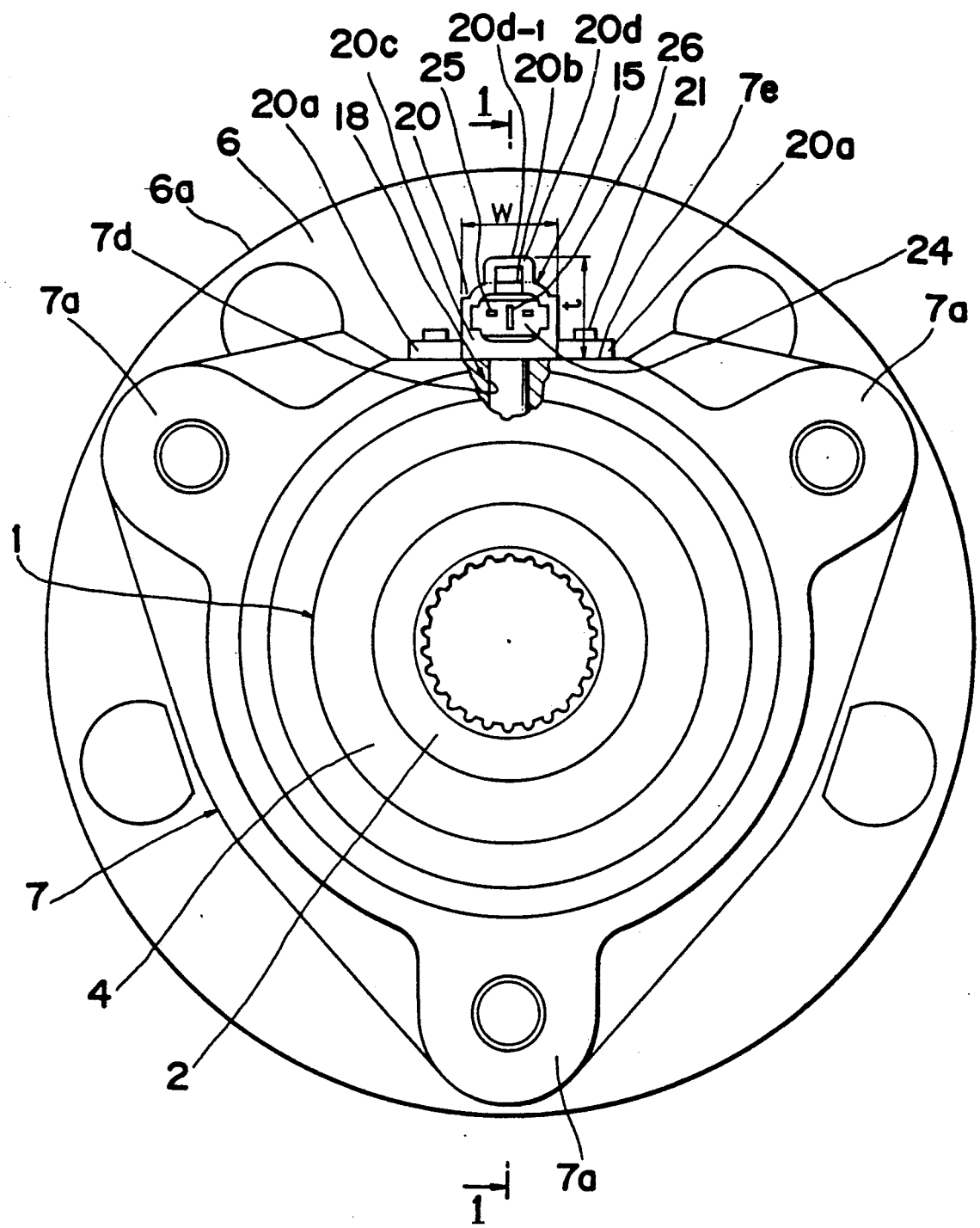
FIG. 2 is an end elevation taken from the direction of arrow A in FIG. 1.

At a point corresponding to a detected members 13, the outside member 7 is provided with a through-hole 7d of a specific diameter D and extending in the radial direction. As shown in FIG. 2, this through-hole 7d is open to the approximate center of flat 7e, which is perpendicular to the radius of outside member 7, and passes through in the radial direction.

As shown in FIG. 1, a simple L-shaped rotational speed detector 15 is mounted on the flat 7e of the outside member 7. This rotation speed detector 15 is comprised of a detector end portion 18 and a circuit housing 20. The detector end portion 18 has a cylindrical pole shape with a diameter approximately equal to diameter D of the through hole 7d. Inside the detector end portion 18 are disposed, in order from the tip, a magnetic resistor element 16 and magnet 17. The circuit housing 20 is connected to the detector end portion 18 and is a simple parallelepiped extending perpendicular to the axis of the detector end portion 18. This circuit housing 20 houses a circuit board 19 which is comprised of circuits (explained in detail later) to process the signals received from magnetic resistor element 16. As shown in the figure, the detector end portion 18 is fit inside the through-hole 7d and positioned so that the end of the detector end portion 18 is held at a constant gap d1 in the radial direction from the outside circumference of multiple projections 13a of the detected member 13 on inside member 1. This maintains a constant distance in the radial direction between magnetic resistor element 16 in the detector end portion 18 and the detected member 13 of the inside member 1. Also, the circuit housing 20 is mounted at the flat 7e extending in the direction of the axis as indicated by arrow X in the figure when the detector end portion 18 is in the through-hole 7d and held at the specified position in the radial direction. The rotational speed detector 15 is mounted on outside member 7 by means of bolts 21 in plate-shaped mounting members 20a provided in the direction of width W on both sides of circuit housing 20 and which are perpendicular to width W.

In this position, outside surface 20d-1 of connecting portion 20d projecting from the end of back 20b of circuit housing 20 of the rotational speed detector 15 is positioned inside in the radial direction from outside circumference surface 6a of the flange 6 of the inside member 1.

As shown in FIG. 1, the magnetic resistor element 16 and the circuit provided in circuit board 19 are connected by means of lead 22. The output from circuit board 19, the casing of which is molded from and sealed by a resin P, is input to the antilock brake system circuit (not shown in the figure) via terminals 25; terminals 25 extend in the axial direction through end of connector portion 24 which is open at the end 20c of the circuit housing 20 which is farthest from the detector end portion 18. The connecting portion 20d connects in the axial direction to the connecting portion of a corresponding component fit to a connector portion 24 and not shown in the figure.

This rotational speed detector 15 is designed for sufficient vibration resistance and sealing performance. In the figure, 26 designates a barrier provided between terminals 25, and 27 designates a sealing member forming a seal between outside member 7 and raceway members 3, 4.

According to the above construction, the magnetic field produced by the magnet 17 in the detector end portion 18 of the rotational speed detector 15 appears at the end of magnet 17, and reaches the detected members 13 through the magnetic resistor element 16, which is held at a constant gap in the radial direction to the detected members 13 of the inside member 1.

When the inside member 1 turns together with the wheel, the annular member 12, which is fixed to the raceway member 3 of the inside member 1 and on the outside circumference surface of which is formed detected members 13, turns together with the inside member 1. Then, the strength and direction of the magnetic field passing the magnetic resistor element 16 change according to the passage in the circumferential direction of multiple projections 13a of the detected members 13, and the resistance of the magnetic resistor element 16 changes as a result. A signal A (see FIG. 3 and FIG. 4), the voltage of which changes according to the passage in the circumferential direction of the multiple projections 13a of detected members 13, is then output from magnetic resistor element 16.

Figure 3:
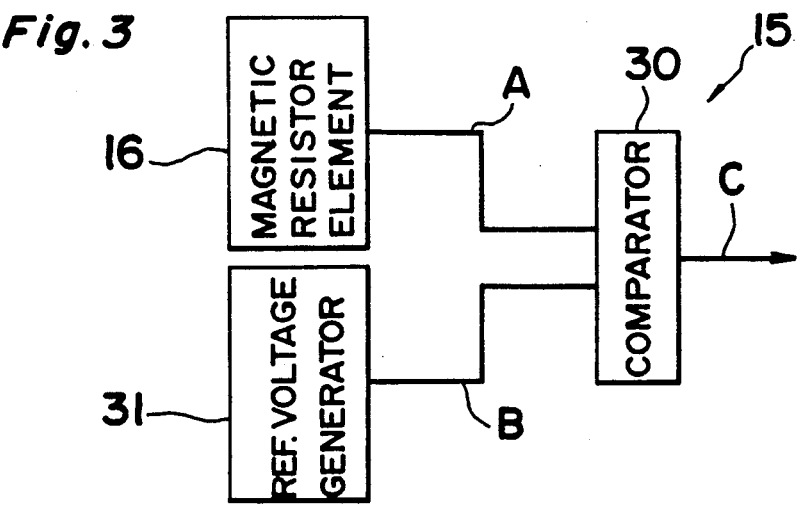
FIG. 3 is a block diagram of the rotational speed detector in the first embodiment.
Figure 4A:
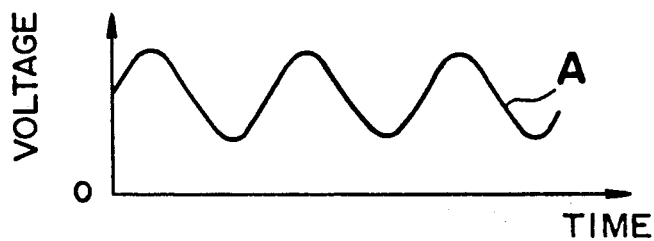
FIGS. 4 (a), (b), (c), and (d) are diagrams of the signals processed by the circuit shown in FIG. 3.
Figure 4B:
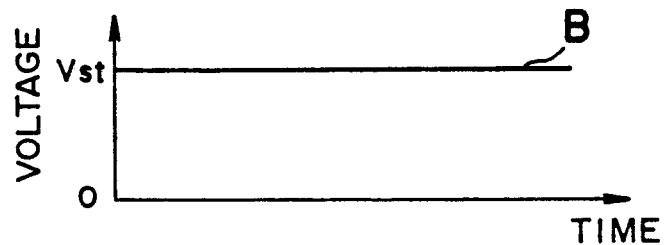
Figure 4C:
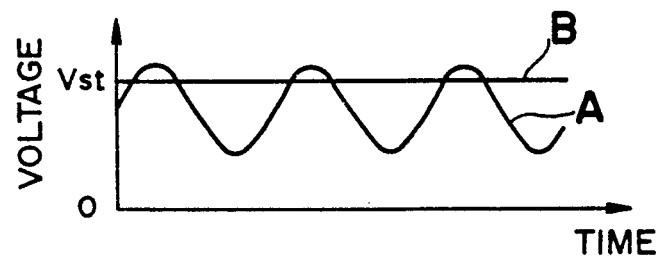
Figure 4D:
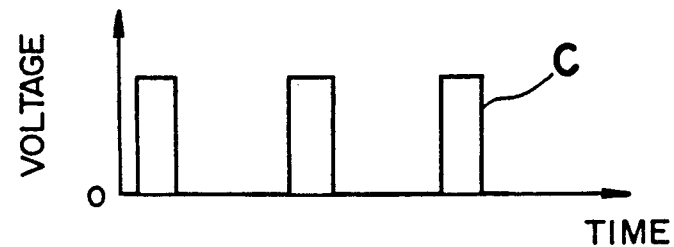

As shown in FIG. 3, signal A output from the magnetic resistor element 16 is inputted to a comparator 30 provided on the circuit board 19 in the circuit housing 20. A reference signal B (see FIG. 4 (b)) is also inputted to the comparator 30 from a reference voltage generator 31 also provided on the circuit board 19. This comparator 30 compares signal A with reference signal B, and outputs a high level signal C when signal A is greater than reference voltage Vst of reference signal B, and outputs a low level signal C when it is not greater (see FIG. 4 (c) and (d)). This signal C from comparator 30 is extracted from the terminals 25 of the connector portion 24 provided in the circuit housing 20. Signal C provides a frequency corresponding to the rotational speed, specifically the angular velocity, of the wheel and inside member 1.

A wheel bearing apparatus according to the present invention is thus provided with an L-shaped rotational speed detector 15 having a cylindrical detector end portion 18, which includes a magnetic resistor element 16 as a sensor, and a circuit housing 20 which houses the circuits used to process signal A detected by the magnetic resistor element 16 and which extends in a direction perpendicular to the detector end portion 18. The detector end portion 18 of rotational speed detector 15 is provided in a through-hole 7d, which is provided in the outside member 7 in the radial direction in such a manner that the magnetic resistor element 16 provided on the end of the detector end portion 18 is maintained at a constant distance from detected member 13. On flat 7e of outside member 7 is provided circuit housing 20 connected perpendicularly to detector end portion 18 and extending direction X. Therefore, it is possible with the wheel bearing apparatus provided with this rotational speed detector 15 to keep the dimension of the projection from the outside member 7 of the circuit housing 20 of the rotational speed detector 15 to a small dimension (t in FIG. 2) in the radial direction of the circuit housing 20. The circuit housing 20 does not extend greatly in the radial direction from the outside surface of outside member 7 as does the circuit housing of a conventional rotational speed detector in which the housing extends in a single axial direction from the detector end. Furthermore, it is also possible to position the outside surface 20d-1 of connecting member 20d, which is positioned at the farthest outside point in the radial direction of the rotational speed detector 15, at a position significantly inside in the radial direction from outside circumference surface 6a of the flange 6 of the inside member 1. Therefore, a wheel bearing apparatus provided with this rotational speed detector 15 makes it easier to transport and install the wheel bearing apparatus when compared with a wheel bearing apparatus provided with a conventional rotational speed detector. In addition, it is, of course, possible to extract a precise signal C which corresponds to the rotational speed of the inside member 1 from the rotational speed detector 15.

Figure 5:
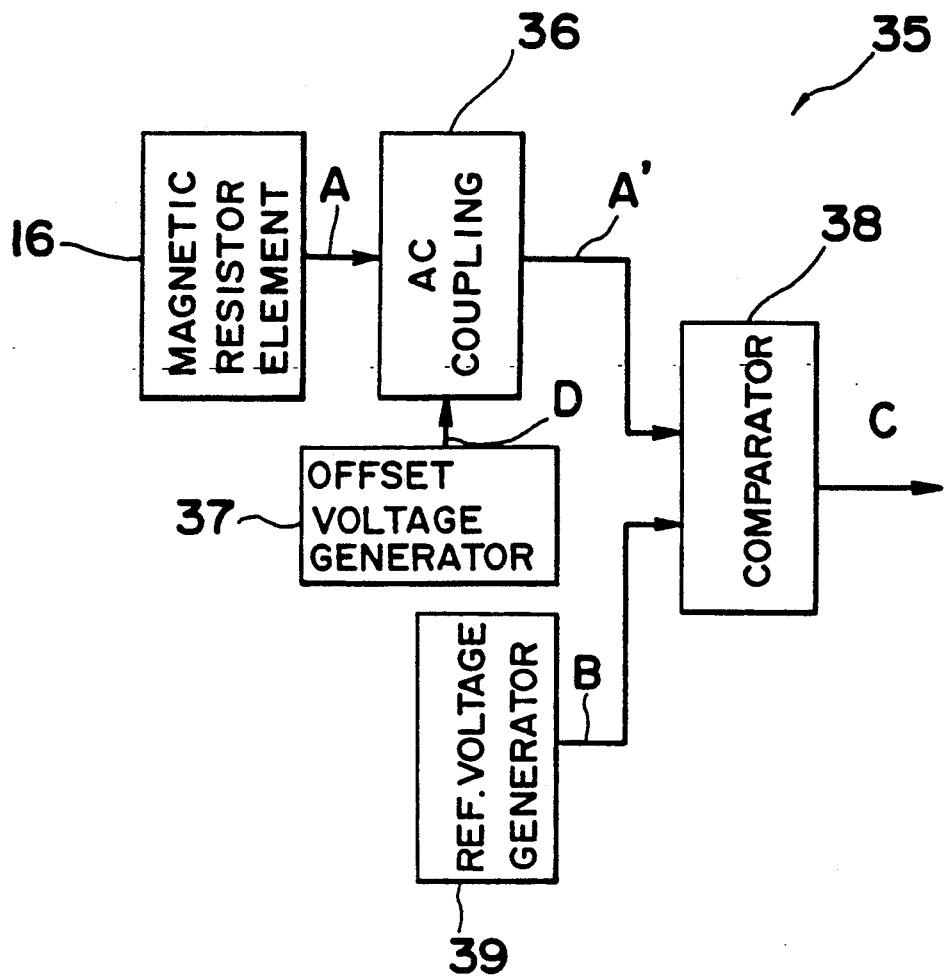
FIG. 5 is a block diagram of the rotational speed detector according to a second embodiment.

FIG. 5 is a block diagram showing a second embodiment of a rotational speed detector 35 of a wheel bearing apparatus provided with a wheel rotational speed detector according to the present invention. This rotational speed detector 35 has the circuit board 19 housed in circuit housing 20 of the rotational speed detector 15 the same as the first embodiment, but the circuit on the circuit board 19 which processes signal A from magnetic resistor element 16 differs from that of the first embodiment, and therefore only the processing of this signal A from magnetic resistor element 16 is described below with reference to FIG. 5.

Figure 6:
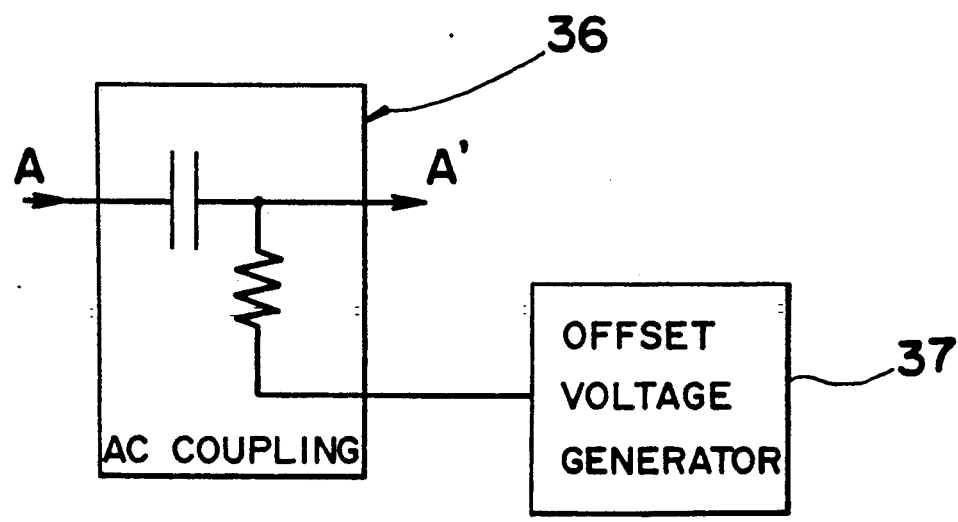
FIG. 6 is a descriptive diagram of the AC coupling in FIG. 5.
Figure 7A:
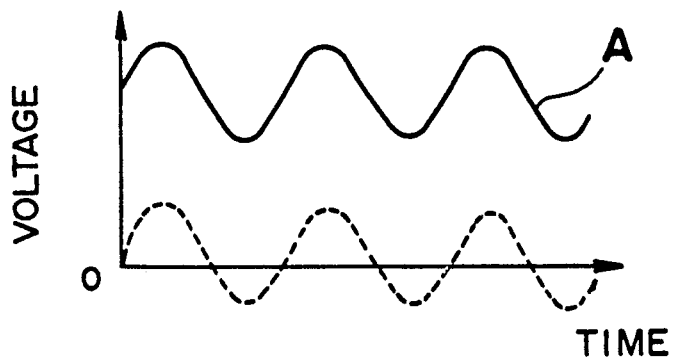
FIGS. 7 (a), (b), (c), (d), and (e) are diagrams of the signals processed by the circuit shown in FIG. 5.
Figure 7B:
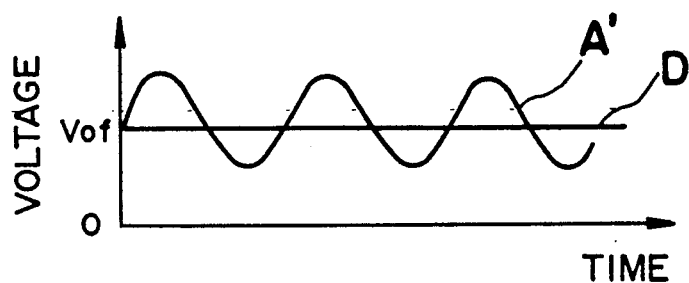
Figure 7C:
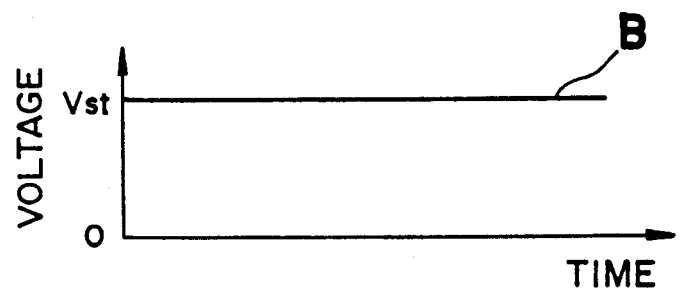
Figure 7D:
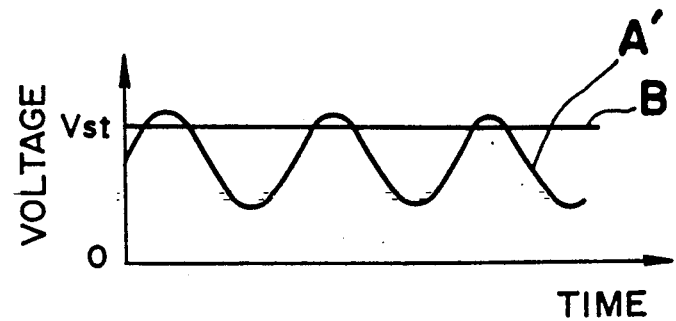
Figure 7E:
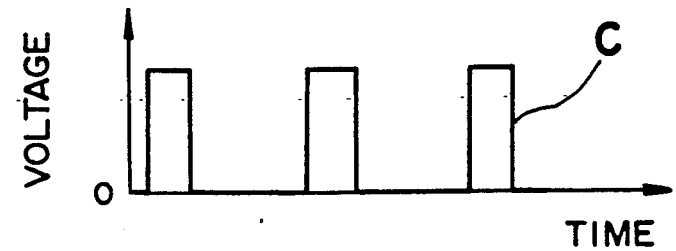

In FIG. 5, when signal A (see FIG. 7 (a)), which, as in the first embodiment previously described, is a voltage signal that changes according to the passage of multiple projections 13a of detected members 13 and is output from magnetic resistor element 16, passes AC coupling 36 (see FIG. 6), only the AC component is passed (the dotted line wave shown in FIG. 7 (a)), the signal is superposed with a constant offset signal D (offset voltage Vof) input from offset voltage generator 37, and converted to signal A' shown in FIG. 7 (b). This signal A' is input to comparator 38. This comparator 38 compares the signal A' received from AC coupling 36 with a reference signal B (FIG. 7 (c)) received from reference voltage generator 39, and outputs a high level signal C when signal A' is greater than reference voltage Vst of reference signal B, and outputs a low level signal C when it is not greater (see FIG. 7 (d) and (e)). This signal C has a frequency corresponding to the angular velocity of the inside member.

If the signal A from the magnetic resistor element 16 is thus processed by a circuit comprised of a AC coupling 36 and offset voltage generator 37, said signal A can be converted to a signal A' which varies based on a constant offset voltage Vof by AC coupling 36 and offset voltage generator 37 even if there is a variation in the average signal level of signal A output by the magnetic resistor element 16, and the effects of the variation in the detection performance of magnetic resistor element 16 on the rotational speed detection can thus be eliminated. All other operations and effects are the same as the first embodiment.

Figure 8:
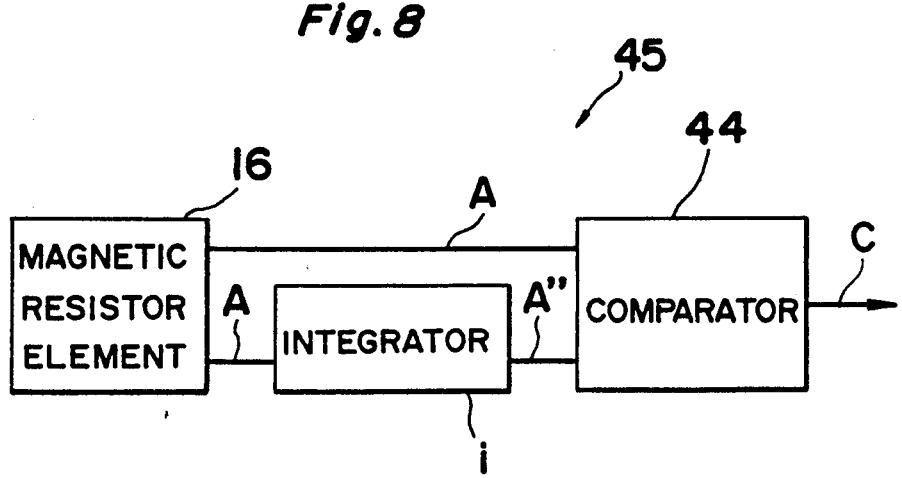
FIG. 8 is a block diagram showing the rotational speed detector according the third embodiment.

FIG. 8 is a block diagram of the rotational speed detector 45 according to a third embodiment of a wheel bearing apparatus according to the present invention. In this third embodiment, the rotational speed detector 45 is the same as the rotational speed detector 15 according to a first embodiment in all respects except the circuit which processes the signal A from the magnetic resistor element 16. This circuit only is therefore explained herein below with reference to FIG. 8.

Figure 9A:
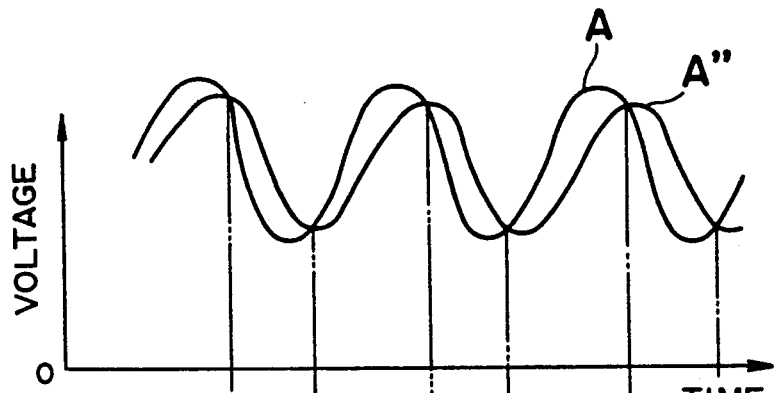
FIGS. 9 (a), (b) are diagrams of the signals processed by the circuit show in FIG. 8.
Figure 9B:
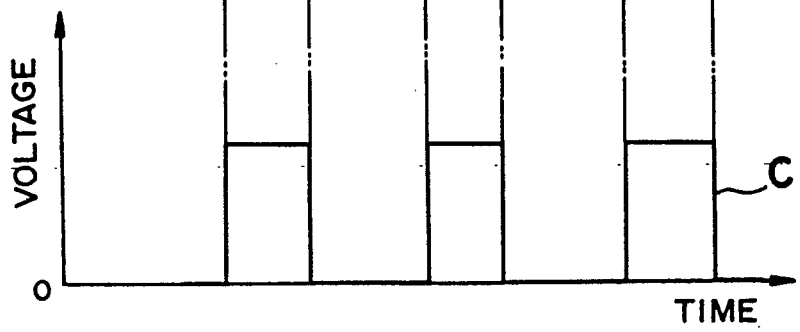

A comparator 44 compares signal A (FIG. 9 (a)) detected from the magnetic resistor element 16 with a signal A'' (FIG. 9 (a)) produced by delaying signal A by a constant phase by an integrating circuit shown as i in FIG. 8. This comparator 44 outputs a high level signal C when signal A'' is greater than signal A, and outputs a low level signal C when it is not greater (see FIG. 9 (b)). This signal C, of course, has a frequency corresponding to the angular velocity of the inside member 1. The voltage level of the signal A'' and signal A compared by comparator 44 are constantly equal independent of characteristic of the magnetic resistor element 16, and thus the circuit as shown in FIG. 8 is able to eliminate the effects of variations in the detection performance of the magnetic resistor element 16 on the rotational speed detection. Thus, a reference voltage generator is not required. All other operations and effects are the same as the first embodiment.

Figure 10:
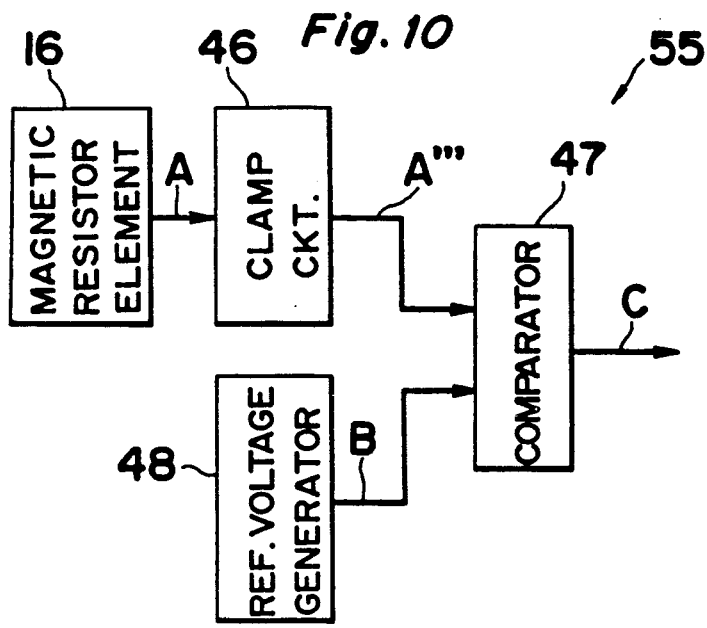
FIG. 10 is a block diagram showing the rotational speed detector according the fourth embodiment.
Figure 11A:
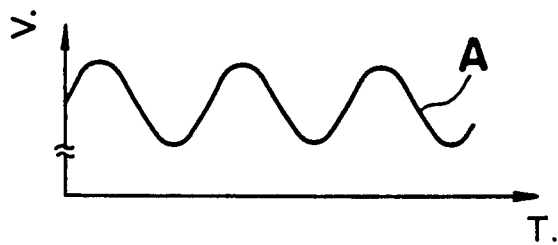
FIGS. 11 (a), (b), (c), (d), and (e) are diagrams of the signals processed by the circuit shown in FIG. 10.
Figure 11B:
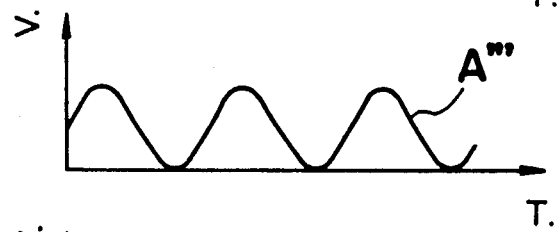
Figure 11C:
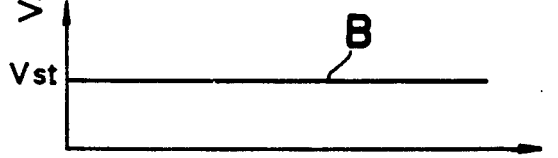
Figure 11D:
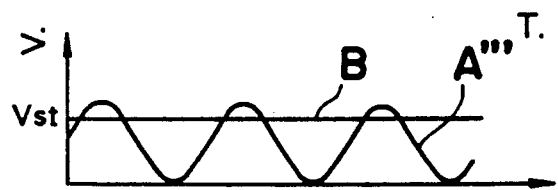
Figure 11E:
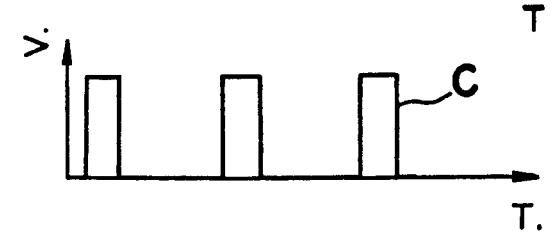

FIG. 10 is a block diagram of the rotational speed detector 45 according to a fourth embodiment of a wheel bearing apparatus provided with a rotational speed detector according to the present invention. In this fourth embodiment, the rotational speed detector 55 is the same as the rotational speed detector 15 according to a first embodiment in all respects except the circuit which processes the signal A from the magnetic resistor element 16. This circuit only is therefore explained herein below with reference to FIG. 10.

As shown in FIG. 10, the signal A (FIG. 11 (a)) output from the magnetic resistor element 16 is converted to a clamped signal A''' (FIG. 11 (b)) of a 0 V clamp by clamp circuit 46, and input to comparator 47. This comparator 47 compares this clamped signal A''' with a reference signal B (FIG. 11 (c), reference voltage Vst) input from reference signal generator 48, and outputs a high level signal C when the clamped signal A''' is greater than reference signal B, and a low level signal C when it is not greater (see FIG. 11 (d), (e)). This signal C, of course, has a frequency corresponding to the angular velocity of the inside member 1. Thus, because signal A from the magnetic resistor element 16 is compared with a reference signal B of specific reference voltage Vst after 0-V clamping by clamp circuit 46, it is possible to compare only the varied part of signal A which is necessary for rotational speed detection with reference signal B. As a result, the variations in the detection performance of the magnetic resistor element 16 can be prevented from affecting rotational speed detection. All other operations and effects are the same as the first embodiment.

In the embodiments described herein before, the rotational speed detector 15 provides a magnet 17 on a detector end portion 18 so as to be adjacent to a magnetic resistor element 16 on the end thereof as shown in FIG. 1. However, as shown in FIG. 12, it is also possible to house a magnet 60 in a circuit housing 20, interpose a yoke 61 between this magnet 6 and the magnetic resistor element 16 on the end of the detector end portion 18, and to magnetically connect the magnet 60 with the magnetic resistor element 16 by means of the yoke 61.

Figure 13A:
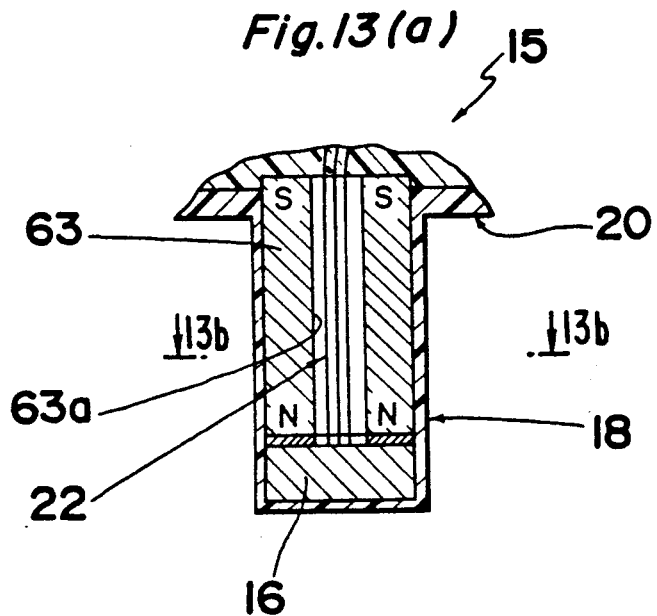
Figure 13B:
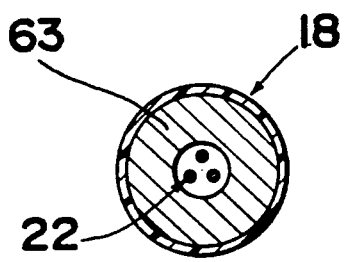

Furthermore, in this embodiment, multiple leads 22 connecting the magnetic resistor element 16 provided on detector end portion 18 of the rotational speed detector 15 with the circuits formed on circuit board 19 in circuit housing 20 are placed along the outside surface of cylindrical magnet 17 as shown in FIG. 1. However, as shown in FIG. 13 (a), (b), a through-hole 63a may be provided in magnet 63 in the axial direction to detector end portion 18, and these multiple leads 22 may be connected to the circuit board, not shown in this figure, and magnetic resistor element 16 through this through-hole 63a.

Figure 12:
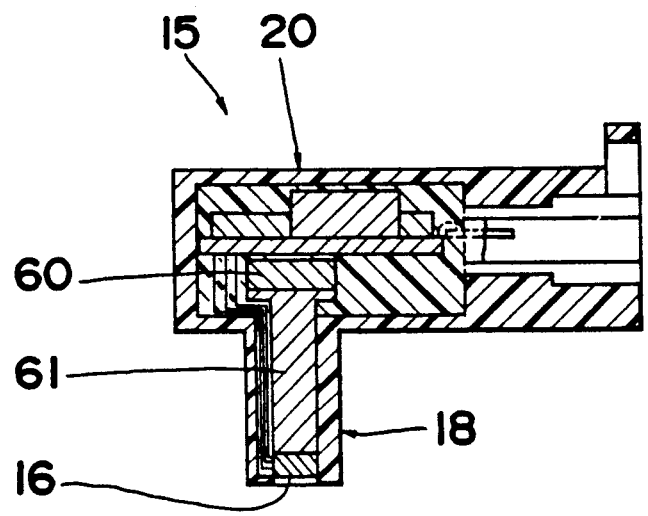
FIg. 12, FIGS. 13 (a)and (b), FIGS. 14 (a), (b), and (c), FIGS. 15 (a), (b), and (c), FIGS. 16 (a) and (b), FIGS. 17 (a) and (b) are each sectional or elevation views of respective alternative embodiments, FIG. 13(b) being a cross section on line 13b-13b in FIG. 13(a), FIGS. 14(b) and (c) being, respectively, cross sections on lines 14b-14b and 14c-14c in FIG. 14(a), FIG. 15(b) and (c) being, respectively, cross sections on lines 15b-15b and 15c-15c in FIGS. 15(a), FIG. 16(b) being an end elevation taken in the direction of arrow C in FIG. 16(a), FIG. 17(b) being an end elevation taken in the direction of arrow C in FIG. 17(a), and FIG. 18 being an axial cross section of a conventional wheel bearing apparatus provided with a wheel rotational speed detector.
Figure 14A:
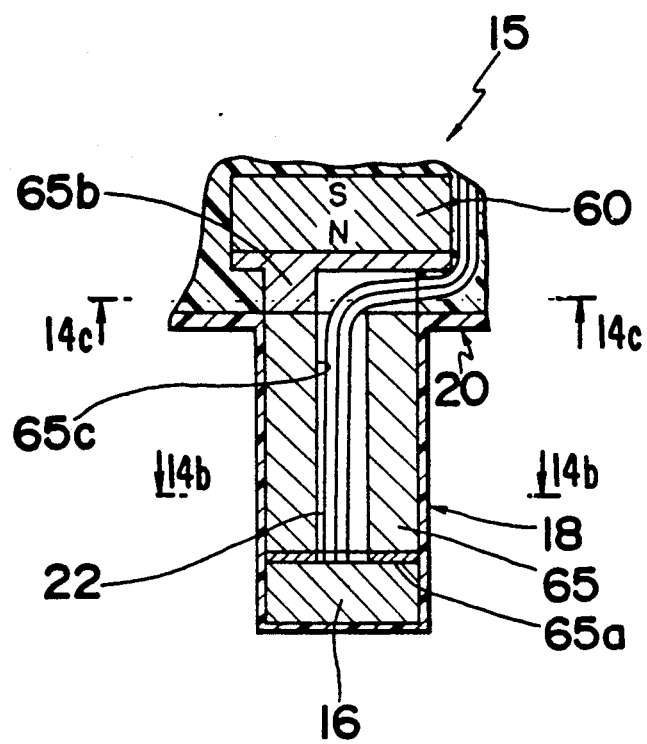
Figure 14B:
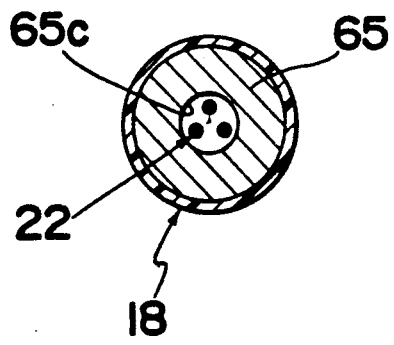
Figure 14C:
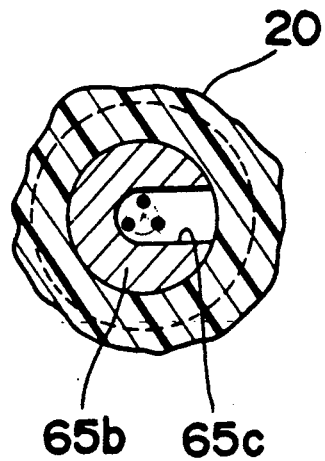

Furthermore, in the above embodiment in which a yoke is interposed between circuit housing 20 and magnetic resistor element 16 on the end of detector end portion 18 of rotation speed detector 15 as shown in FIG. 12, as shown in FIG. 14, an L-shaped hole 65c may be provided in yoke 65 connecting the approximate center of bottom surface 65a of yoke 65 and the side of part 65b positioned at circuit housing 20 of yoke 65 so that the leads 22 connecting the magnetic resistor element 16 with the circuit board (not shown in the figure) can be passed through said hole 65c.

Figure 15A:
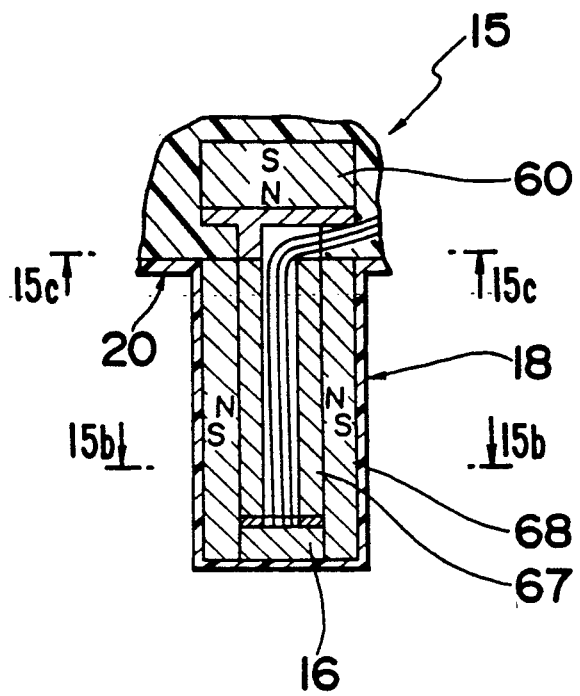
Figure 15B:
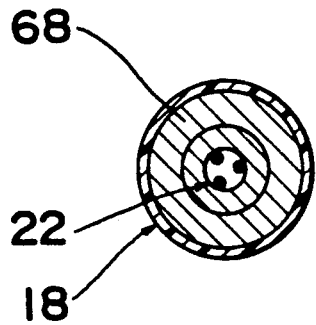
Figure 15C:
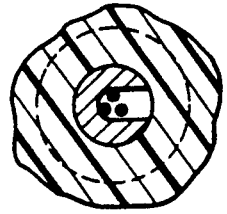

As shown in FIG. 15, the outside surface of the yoke 67 which is between the magnetic resistor element 16 and the magnet 60 and extends in the direction of the axis of detector end portion 18 may also be enclosed with a cylindrical magnet 68 having a polarity as shown in the figure. It is thus possible to conduct the line of magnetic force produced by the magnet 60 efficiently through the magnetic resistor element 16. Furthermore, it is also possible to prevent the influence of external magnetic forces. The magnetic force of the magnet 60 is also sufficiently greater than that of the cylindrical magnet 68.

Figure 16A:
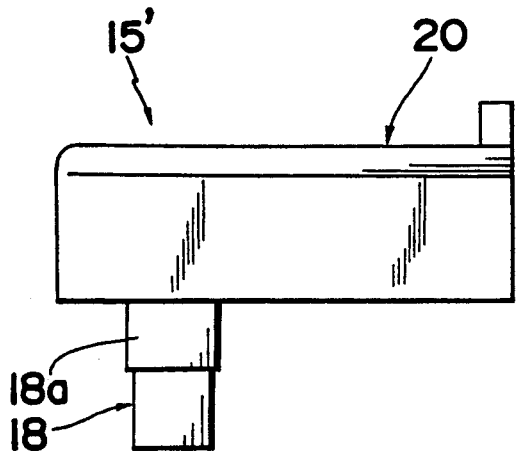
Figure 16B:
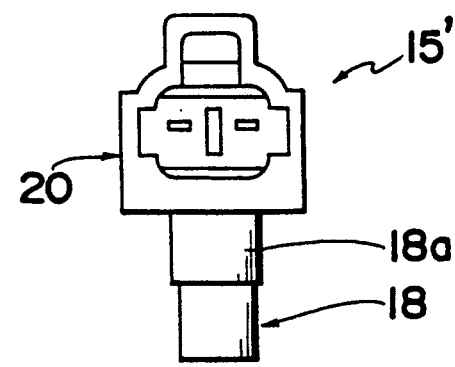

In addition, the rotational speed detector 15 in the above embodiment is also provided with mounting members 20a provided in the direction of width W in FIG. 2 on both sides of circuit housing 20, and this rotational speed detector 15 is fit to outside member 7 by screwing or bolting the mounting members 20a to outside member 7. This rotational speed detector 15 may also be constructed as indicated by 15' in FIG. 16, showing a rotational speed detector 15' with mounting members 20a removed. In this embodiment, a large diameter fitting 18a is provided on a detector end portion 18, and the rotational speed detector 15' is mounted in the outside member 7 by press fitting large diameter fitting 18a into the through-hole 7d provided in the radial direction in the outside member 7.

Figure 17A:
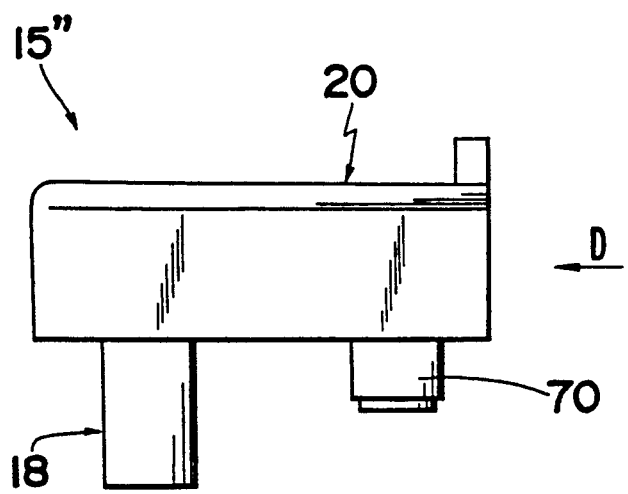
Figure 17B:
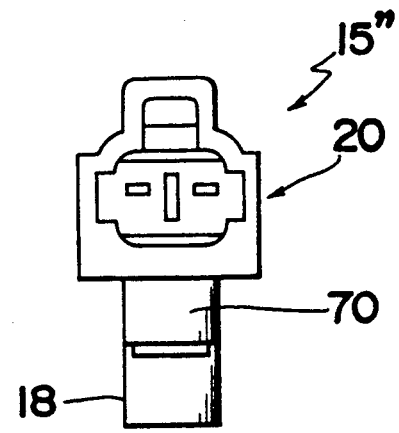
Figure 18:
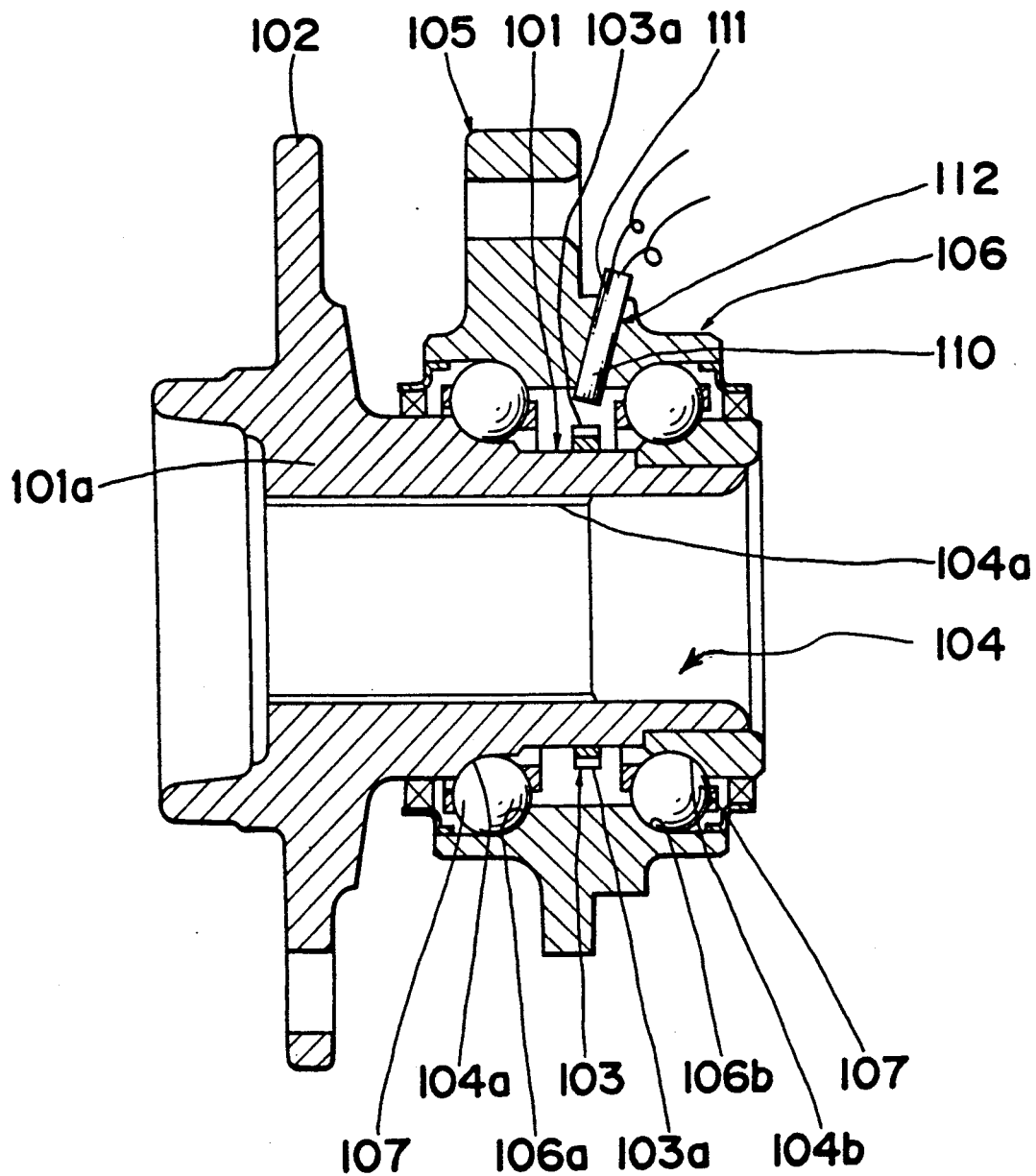

As also shown in FIG. 17, a dedicated mounting stud 70 parallel to and at a specified distance from detector end portion 18 portion may also be provided on the circuit housing 20, and a rotational speed detector 15" may be mounted to outside member 7 by press fitting this stud 70 into a mounting hole provided in the radial direction separately from a through-hole 7d provided for the detector end portion 18 in the outside member 7.

Furthermore, in the various embodiments described herein above, the magnetic resistor element 16 on the detector end portion 18 of the rotational speed detectors 15, 15', and 15" is used as the sensor that detects the passage of multiple projections 13a of detected members 13 in the circumferential direction, but the present invention is not limited to the use of a magnetic resistance element for the sensor detecting the passage in the circumferential direction of multiple projections 13a of detected members 13. In addition, the direction of sensor and detected member opposition is not restricted to the radial direction, but may align with, for example, the axial direction or any constant angle to the axial direction.

As will be clear from the above description, according to the present invention, the wheel rotational speed detector has a simplified L-shape formed by a detector end portion and circuit housing. When mounted on the outside member, said detector end portion, which comprises a sensor in opposition to the detected member of the inside member, is embedded in said outside member and is aligned with the radial direction so as to be opposed to said detected member; the circuit housing, which is connected to this detector end portion and contains the circuit that processes the signals input from the sensor, is provided so as to be aligned in the axial direction on the outside surface of the outside member, and is, moreover, positioned inside in the radial direction from the outside surface of the flange, which is at one end of the cylindrical inside member and used to mount the inside member to the wheel. Therefore, in a wheel bearing apparatus according to the present invention, the circuit housing does not extend greatly to the outside in the radial direction. Thus, a wheel bearing apparatus provided with a wheel rotational speed detector according to the present invention is easier to handle and assemble with the chassis when compared with a conventional wheel bearing apparatus comprised of a wheel rotational speed detector.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wheel bearing apparatus which comprises: an inside member having a main body lying along an axis, a flange projecting radially outwardly on one end of said main body for mounting the wheel bearing apparatus on a wheel, said flange having a radially outer edge, and a detected member which has multiple projections placed at regular intervals around the circumference of the main body; an outside member which is placed on the same axis as the inside member and adapted to be fixed to a chassis; multiple rolling elements which are placed between raceway surfaces of the inside member and raceway surfaces of the outside member so as to roll in the circumferential direction on the raceway surfaces; and a wheel rotation speed detector which is mounted on the outside member and which includes a detector end portion having a sensor in spaced opposed relation to the detected member of the inside member, and a circuit housing which is connected to the detector end portion and contains a circuit for processing a signal input from the sensor, so that the rotation of the inside member is detected by the wheel rotational speed detector;

said wheel rotation speed detector having a simplified L-shape, and the detector end portion being embedded in the outside member and extending substantially in the radial direction of the outside member so as to be in spaced opposed relation to the detected member, and the circuit housing is provided on the outside surface of the outside member in parallel with the axial direction of the outside member being inside, in the radial direction, the radially outer edge of the flange;

said outside member having at least one flange projecting in the radial direction of the outside member and having radially outer edges, and a surface portion on the outside surface of the outside member positioned radially inwardly of said radially outer edges of said flanges and extending in parallel with the axial direction of the outside member, said circuit housing of said rotational speed detector being mounted on said surface portion and lying inside, in the radial direction, of said radially outer edges of said flanges and having a connector portion at an end of the circuit housing, said connector portion having an opening which faces neither the flange of said outside member nor the flange of said inside member.

2. A wheel bearing apparatus as claimed in claim 1, wherein the sensor is a magnetic resistor element.

3. A wheel bearing apparatus as claimed in claim 1, further comprising plate-shaped mounting members extending in the direction of width on both sides of the circuit housing, and the rotation speed detector is fixed to the outside member by means of bolts through the mounting members.

4. A wheel bearing apparatus as claimed in claim 1, further comprising terminals extending in the axial direction at the end of the circuit housing which is farthest from the detector end portion.

5. A wheel bearing apparatus as claimed in claim 1, wherein the circuit in the circuit housing is comprised of a comparator and a reference signal generator, said comparator comparing a signal input from the sensor with a reference signal input from the reference signal generator.

6. A wheel bearing apparatus as claimed in claim 1, wherein the circuit in the circuit housing is comprised of an alternating current coupling, an offset voltage generator, a reference signal generator and a comparator, said alternating current coupling extracting only alternating component in a signal input from the sensor and superposing the alternating component with a constant offset signal input from the offset voltage generator, and said comparator comparing a signal input from the alternating current coupling with a reference signal input from the reference signal generator.

7. A wheel bearing apparatus as claimed in claim 1, wherein the circuit in the circuit housing is comprised of an integrating circuit and a comparator, said integrating circuit delaying a signal input from the sensor by a constant phase, and said comparator comparing a signal input from the integrating circuit with a signal directly input from the sensor.

8. A wheel bearing apparatus as claimed in claim 1, wherein the circuit in the circuit housing is comprised of a clamp circuit, a reference signal generator and a comparator, said clamp circuit clamping a signal input by the sensor to a constant level voltage, and said comparator comparing a clamped signal input from the clamp circuit with a reference signal from the reference signal generator.

9. A wheel bearing apparatus as claimed in claim 1, further comprising a dedicated mounting stud parallel to and at a specified distance from the detector end portion on the circuit housing, and the rotational speed detector is mounted on the outside member by press-fitting the stud in a mounting hole provided in the radial direction separate from a through hole provided for the detector end portion in the outside member.

* * * * *